(12) United States Patent
Yang et al.

(10) Patent No.: US 10,597,550 B2
(45) Date of Patent: Mar. 24, 2020

(54) AQUEOUS POLYMER DISPERSION AND PROCESS OF MAKING THE SAME

(71) Applicants: Dow Global Technologies LLC, Midland, MI (US); Rohm and Haas Company, Collegeville, PA (US)

(72) Inventors: Xiaohong Yang, Shanghai (CN); Yaobang Li, Shanghai (CN); Yawei Xu, Shanghai (CN); Yan Wu, Shanghai (CN)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 26 days.

(21) Appl. No.: 15/768,839

(22) PCT Filed: Nov. 24, 2015

(86) PCT No.: PCT/CN2015/095368
§ 371 (c)(1),
(2) Date: Apr. 17, 2018

(87) PCT Pub. No.: WO2017/088104
PCT Pub. Date: Jun. 1, 2017

(65) Prior Publication Data
US 2018/0298223 A1  Oct. 18, 2018

(51) Int. Cl.
| | | |
|---|---|---|
| *C09D 15/00* | (2006.01) |
| *B05D 7/06* | (2006.01) |
| *C08F 2/26* | (2006.01) |
| *C08F 220/04* | (2006.01) |
| *C08F 220/18* | (2006.01) |
| *C08F 220/10* | (2006.01) |
| *C08F 265/06* | (2006.01) |
| *C08L 25/14* | (2006.01) |
| *C09D 125/14* | (2006.01) |
| *C09D 133/04* | (2006.01) |
| *C09D 133/10* | (2006.01) |
| *C09D 133/12* | (2006.01) |
| *C09D 151/00* | (2006.01) |
| *B05D 3/02* | (2006.01) |

(52) U.S. Cl.
CPC ........... *C09D 15/00* (2013.01); *B05D 3/0254* (2013.01); *B05D 7/06* (2013.01); *C08F 2/26* (2013.01); *C08F 220/04* (2013.01); *C08F 220/10* (2013.01); *C08F 220/18* (2013.01); *C08F 265/06* (2013.01); *C08L 25/14* (2013.01); *C09D 125/14* (2013.01); *C09D 133/04* (2013.01); *C09D 133/10* (2013.01); *C09D 133/12* (2013.01); *C09D 151/003* (2013.01)

(58) Field of Classification Search
CPC .... C09D 15/00; C09D 125/14; C09D 133/14; C09D 133/10; C09D 133/12; C09D 151/003; B05D 3/0254; B05D 7/06; C08F 2/26; C08F 220/04; C08F 220/10; C08F 220/18; C08F 265/06; C08L 25/14
USPC ....................................................... 524/521
See application file for complete search history.

(56) References Cited

U.S. PATENT DOCUMENTS

| | | |
|---|---|---|
| 5,849,835 A | 12/1998 | Das et al. |
| 6,099,912 A | 8/2000 | Borgholte et al. |
| 2003/0078338 A1 | 4/2003 | Schlarb et al. |
| 2006/0199941 A1 | 9/2006 | Julien et al. |
| 2012/0214928 A1 | 8/2012 | Raman et al. |
| 2015/0111026 A1* | 4/2015 | Azuma ............. C09D 7/40 428/327 |

FOREIGN PATENT DOCUMENTS

| | | |
|---|---|---|
| CA | 2338789 C | 1/2009 |
| CA | 2780588 A1 | 6/2011 |
| CN | 101481437 A | 7/2009 |
| CN | 101638451 A | 2/2010 |
| CN | 101817906 A | 9/2010 |
| CN | 102516446 A | 6/2012 |
| CN | 103333293 A | 10/2013 |
| FR | 2765878 A1 | 1/1999 |
| JP | 2001262013 A | 9/2001 |
| WO | 2010055044 A1 | 5/2010 |

OTHER PUBLICATIONS

Brandrup, J. and Immergut, E H.; Polymer Handbook 3rd edition; Glass Transition Temperatures of Polymers, Chapter VI, pp. 215-277 (1989) Interscience Publishers.

* cited by examiner

*Primary Examiner* — William K Cheung
(74) *Attorney, Agent, or Firm* — Karl E. Stauss; Cantor Colburn LLP

(57) ABSTRACT

An aqueous polymer dispersion and an aqueous coating composition comprising the aqueous polymer dispersion; and the aqueous coating composition capable of providing coating films with excellent tannin blocking and satisfactory early block resistance and sandability.

13 Claims, No Drawings

AQUEOUS POLYMER DISPERSION AND PROCESS OF MAKING THE SAME

This application is a U.S. National Stage Application which claims the benefit under 35 U.S.C. § 371 of PCT International Patent Application No. PCT/CN2015/095368, filed, Nov. 24, 2015.

FIELD OF THE INVENTION

The present invention relates to an aqueous polymer dispersion and a process of making the same.

INTRODUCTION

Waterborne coating compositions are widely used in industrial and architectural applications. However, waterborne coatings have found limited acceptance in wood finishing. Water-soluble chromophoric compounds, such as tannin, on and in the wood surface bleed through the applied waterborne coatings to stain, discolor and detract from the resulting finish quality, particularly for coatings on tannin rich wood substrates such as Merbau or Cedar (red pine). The color change impacts furniture appearance, especially when the furniture is coated with white paints.

Attempts have been made to improve tannin blocking of pigmented coating systems comprising a primer and a topcoat. Primers comprising aqueous cationic dispersions of polymers with amine functional groups on polymer backbone can interact with tannin, thus blocking migration of tannin from substrates through topcoats. However, these cationic aqueous dispersions have stability issues especially when used in pigmented coating formulations. In addition, coating films formed from these primers usually have unsatisfactory water resistance and are not compatible with topcoats which often use anionic polymers, leading to adhesion loss. After application of primers, coated panels need to be further sanded or stacked together for next coat. Thus, satisfactory sandability and early block resistance are also desirable properties.

Therefore, it is desirable to provide a waterborne polymer, particularly suitable for wood coatings, capable of providing excellent tannin blocking and satisfactory early block resistance and sandability.

SUMMARY OF THE INVENTION

The present invention provides a novel aqueous polymer dispersion, and preferably an aqueous multistage polymer dispersion. A coating composition comprising the aqueous polymer dispersion provides coating films with improved tannin blocking as indicated by an initial b≤2.5 and delta E (40° C., 85% humidity, 24 hours)≤1.5; an early block resistance level of C or better; and a sandability level of 3 or higher. The tannin blocking, early block resistance and sandability are measured according to the test methods described in the Examples section.

In a first aspect, the present invention is an aqueous polymer dispersion, wherein the polymer comprises as polymerized units, based on the total dry weight of the polymer, (i) from 5% to 50% by weight of a $C_6$-$C_{18}$ alkyl ester of (meth)acrylic acid;

(ii) from 15% to 45% by weight of a cycloalkyl (meth)acrylate; and (iii) from 1% to 10% by weight of an acid monomer selected from an α,β-ethylenically unsaturated carboxylic acid, a phosphorous-containing acid monomer, or mixtures thereof; and (iv) from 5% to 50% by weight of a vinyl aromatic monomer; and (v) from 0 to 55% by weight of a $C_1$-$C_4$ alkyl ester of (meth)acrylic acid;

wherein the polymer has a glass transition temperature less than 45° C.

In a second aspect, the present invention is an aqueous coating composition comprising the aqueous polymer dispersion of the first aspect.

In a third aspect, the present invention is a method of improving tannin blocking of a coating. The method comprises:

providing the aqueous coating composition of the first aspect, applying the aqueous coating composition to a wood substrate, and drying, or allowing to dry, the aqueous coating composition to form a coating.

DETAILED DESCRIPTION OF THE INVENTION

Glass transition temperature ($T_g$) values in the present invention are those calculated by using the Fox equation (T. G. Fox, Bull. Am. Physics Soc., Volume 1, Issue No. 3, page 123 (1956)). For example, for calculating the $T_g$ of a copolymer of monomers $M_1$ and $M_2$, $$\frac{1}{T_g(calc.)} = \frac{w(M_1)}{T_g(M_1)} + \frac{w(M_2)}{T_g(M_2)},$$

wherein $T_g$(calc.) is the glass transition temperature calculated for the copolymer, $w(M_1)$ is the weight fraction of monomer $M_1$ in the copolymer, $w(M_2)$ is the weight fraction of monomer $M_2$ in the copolymer, $T_g(M_1)$ is the glass transition temperature of the homopolymer of $M_1$, and $T_g(M_2)$ is the glass transition temperature of the homopolymer of $M_2$, all temperatures being in K. The glass transition temperatures of monomers may be found, for example, in "Polymer Handbook", edited by J. Brandrup and E. H. Immergut, Interscience Publishers.

The aqueous polymer dispersion of the present invention comprises polymer particles. The polymer useful in the present invention, preferably a multistage polymer, may comprise as polymerized units, one or more $C_6$-$C_{18}$ alkyl esters of (meth)acrylic acid, and preferably $C_6$-$C_{12}$ alkyl esters of (meth)acrylic acid. Examples of suitable $C_6$-$C_{18}$ alkyl esters of (meth)acrylic acid include 2-ethylhexyl acrylate, lauryl (meth)acrylate, stearyl (meth)acrylate, or mixtures thereof. Preferably, 2-ethylhexyl acrylate is used. The polymer may comprise as polymerized units, based on the total dry weight of the polymer, 5% by weight or more of the $C_6$-$C_{18}$ alkyl esters of (meth)acrylic acid, 10% by weight or more, 15% by weight or more, or even 25% by weight or more, and at the same time, 50% by weight or less, 45% by weight or less, or even 40% by weight or less.

The polymer useful in the present invention may further comprise, as polymerized units, one or more cycloalkyl (meth)acrylates. Examples of suitable cycloalkyl (meth) acrylates include cyclohexyl(meth)acrylate, isobornyl methacrylate, dihydrodicyclopentadienyl acrylate, or mixtures thereof. The polymer may comprise as polymerized units, based on the total dry weight of the polymer, 15% by weight or more of the cycloalkyl (meth)acrylate, 20% by weight or more, or even 25% by weight or more, and at the same time, 45% by weight or less, 40% by weight or less, or even 30% by weight or less.

The polymer useful in the present invention may also comprise, as polymerized units, one or more acid monomers selected from an α,β-ethylenically unsaturated carboxylic acid, a phosphorous-containing acid monomer, or mixtures thereof. Preferably, the acid monomer is a mixture of an α,β-ethylenically unsaturated carboxylic acid and an phosphorous-containing acid monomer.

Examples of suitable α,β-ethylenically unsaturated carboxylic acids include an acid-bearing monomer such as (meth)acrylic acid, itacolic acid, or fumaric acid; or a monomer bearing an acid-forming group which yields or is subsequently convertible to, such an acid group (such as anhydride, (meth)acrylic anhydride, or maleic anhydride); or mixtures thereof.

Examples of suitable phosphorous-containing acid monomers include phosphoalkyl (meth)acrylates such as phosphoethyl (meth)acrylate, phosphopropyl (meth)acrylate, phosphobutyl (meth)acrylate, salts thereof, and mixtures thereof; $CH_2=C(R)-C(O)-O-(R_1O)_n-P(O)(OH)_2$, wherein R=H or $CH_3$ and $R_1$=alkyl, such as SIPOMER™ PAM-100, SIPOMER PAM-200, and SIPOMER PAM-300 all available from Solvay; phosphoalkoxy (meth)acrylates such as phospho ethylene glycol (meth)acrylate, phospho di-ethylene glycol (meth)acrylate, phospho tri-ethylene glycol (meth)acrylate, phospho propylene glycol (meth)acrylate, phospho di-propylene glycol (meth)acrylate, phospho tri-propylene glycol (meth)acrylate, salts thereof, and mixtures thereof. Preferred phosphorus-containing acid monomers are dihydrogen phosphate monomers, which include 2-phosphoethyl (meth)acrylate, 2-phosphopropyl (meth) acrylate, 3-phosphopropyl (meth)acrylate, 3-phospho-2-hydroxypropyl (meth)acrylate, SIPOMER PAM-100, SIPOMER PAM-200, SIPOMER PAM-300, or mixtures thereof.

Preferred acid monomers are selected from (meth)acrylic acid, phosphoethyl (meth)acrylate, or mixtures thereof.

The polymer useful in the present invention may comprise as polymerized units, based on the total dry weight of the polymer, the acid monomers in a combined amount of 1% by weight or more, 1.3% by weight or more, 1.6% by weight or more, or even 1.7% by weight or more, and at the same time, 10% by weight or less, 7% by weight or less, 6% by weight or less, or even 5% by weight or less.

The polymer useful in the present invention may further comprise, as polymerized units, one or more vinyl aromatic monomers. Examples of suitable vinyl aromatic monomers include styrene and substituted styrene such as .alpha.-methyl styrene, p-methyl styrene, t-butyl styrene, or mixtures thereof. Preferred vinyl aromatic monomer is styrene. The polymer may comprise as polymerized units, based on the total dry weight of the polymer, 5% by weight or more of the vinyl aromatic monomer, 10% by weight or more, 15% by weight or more, or even 20% by weight or more, and at the same time, 50% by weight or less, 45% by weight or less, 42% by weight or less, or even 38% by weight or less.

The polymer useful in the present invention may also comprise, as polymerized units, one or more $C_1$-$C_4$ alkyl esters of (meth)acrylic acid. Examples of suitable $C_1$-$C_4$ alkyl esters of (meth)acrylic acid include methyl (meth) acrylate, ethyl (meth)acrylate, butyl (meth)acrylate, isobutyl (meth)acrylate, or mixtures thereof. Preferred $C_1$-$C_4$ alkyl esters of (meth)acrylic acid are selected from methyl (meth)acrylate, butyl (meth)acrylate, or mixtures thereof. The polymer may comprise as polymerized units, based on the total dry weight of the polymer, from 0 to 55% by weight of the $C_1$-$C_4$ alkyl esters of (meth)acrylic acid, from 0 to 45% by weight, or from 0 to 35% by weight.

The polymer useful in the present invention may further comprise, as polymerized units, one or more multiethylenically unsaturated monomers. Examples of suitable multiethylenically unsaturated monomers include alkylene glycol diacrylates and dimethacrylates, such as for example, ethylene glycol di(meth)acrylate; 1,1,1-trimethylol propane di(meth)acrylate; pentaerythritol trimethacrylate; divinyl benzene; vinyl (meth)acrylate; allyl(meth)acrylate; butadiene; divinyl benzene; or mixtures thereof. Preferred multiethylenically unsaturated monomers are selected from allyl (meth)acrylate, ethylene glycol di(meth)acrylate, or mixtures thereof. The polymer may comprise as polymerized units, based on the total dry weight of the polymer, from 0 to 3% by weight of the multiethylenically unsaturated monomers, from 0 to 2% by weight, or from 0 to 1% by weight.

The polymer useful in the present invention can be a single stage polymer that is prepared by a single stage polymerization or a multistage polymer such as two-stage polymer that is prepared by a multistage polymerization. Preferably, the polymer is a multistage polymer. More preferably, the polymer, preferably the multistage polymer, comprises:

(A) a polymer A comprising, as polymerized units,
    (a1) a $C_6$-$C_{18}$ alkyl ester of (meth)acrylic acid;
    (a2) a cycloalkyl (meth)acrylate;
    (a3) an acid monomer selected from an α,β-ethylenically unsaturated carboxylic acid, a phosphorous-containing acid monomer, or mixtures thereof;
    (a4) optionally a vinyl aromatic monomer; and
    (a5) optionally a $C_1$-$C_4$ alkyl ester of (meth)acrylic acid; and (B) a polymer B having a $T_g$ of at least 70° C. and comprising, as polymerized units, one or more monomers selected from a vinyl aromatic monomer, a cycloalkyl (meth)acrylate, or mixtures thereof; and wherein the weight ratio of the polymer A to the polymer B may be from 50:50 to 95:5.

Types and examples of the above monomers constituting the polymerized units of the polymer A and the polymer B are as previously described for monomers for preparing the polymer above. The $C_6$-$C_{18}$ alkyl ester of (meth)acrylic acid in the polymer A, monomer (a1), may be present, as polymerized units, in an amount of from 5% to 50% by weight, from 25% to 45% by weight, or from 25% to 40% by weight, based on the total dry weight of the polymer, i.e., the total dry weight of the polymer A and the polymer B. The cycloalkyl (meth)acrylate in the polymer A, monomer (a2), may be present, as polymerized units, in an amount of from 15% to 45% by weight or from 25% to 35% by weight, based on the total dry weight of the polymer. The acid monomer in the polymer A, monomer (a3), may be present, as polymerized units, in an amount of from 1.0% to 10% by weight, from 1.3% to 5% by weight, from 1.3% to 4% by weight, or from 1.3% to 3% by weight, based on the total dry weight of the polymer. The optional vinyl aromatic monomer in the polymer A, monomer (a4), may be present, as polymerized units, in an amount of from 0 to 30% by weight or from 0 to 20% by weight, based on the total dry weight of the polymer. The optional $C_1$-$C_4$ alkyl esters of (meth) acrylic acid in the polymer A, monomer (a5), may be present, as polymerized units, in an amount of from 0 to 35% by weight, based on the total dry weight of the polymer.

Preferably, the polymer B comprises, as polymerized units, one or more vinyl aromatic monomers such as styrene. The polymer B may comprise as polymerized units, based on the total dry weight of the polymer, from 5% to 50% by weight, from 5% to 40% by weight, or from 7.5% to 35% by weight of the vinyl aromatic monomer. The dosage of monomers for preparing the polymer B may be in an amount to provide the polymer B with a $T_g$ of at least 70° C. or at least 80° C.

More preferably, the polymer in the aqueous polymer dispersion comprises, based on the total dry weight of the polymer (i.e., the total dry weight of the polymer A and the polymer B), (A) the polymer A comprising, as polymerized units,
(a1) from 25% to 45% by weight of the $C_6$-$C_{18}$ alkyl ester of (meth)acrylic acid;
(a2) from 25% to 35% by weight of the cycloalkyl (meth)acrylate;
(a3) from 1.3% to 5% by weight of the acid monomer selected from an α,β-ethylenically unsaturated carboxylic acid, a phosphorous-containing acid monomer, or mixtures thereof;
(a4) from 0 to 30% by weight of the vinyl aromatic monomer; and
(a5) from 0 to 35% by weight of the $C_1$-$C_4$ alkyl ester of (meth)acrylic acid; and
(B) the polymer B comprising, as polymerized units, from 7.5% to 35% by weight of the vinyl aromatic monomer, the cycloalkyl (meth)acrylate, or mixtures thereof;
wherein the weight ratio of the polymer A to the polymer B is from 50:50 to 95:5.

The weight ratio of the polymer A to the polymer B in the polymer useful in the present invention can be from 60:40 to 90:10 or from 70:30 to 95:5.

The types and levels of the monomers described above may be chosen to provide the polymer with a $T_g$ suitable for different applications. The $T_g$ of the polymer useful in the present invention may be less than 45° C., 40° C. or less, 35° C. or less, or even 30° C. or less.

A process of preparing the polymer useful in the present invention may include polymerization techniques well known in the art. Emulsion polymerization of the monomers described above is a preferred process. Total weight concentration of monomers for preparing the polymer is equal to 100%. For example, the total weight concentration of the $C_6$-$C_{18}$ alkyl ester of (meth)acrylic acid, the cycloalkyl (meth)acrylate, the acid monomer, the vinyl aromatic monomer, and other optional monomers described above, such as the $C_1$-$C_4$ alkyl ester of (meth)acrylic acid and the multi-ethylenically unsaturated monomer, is equal to 100%. A mixture of the monomers for preparing the polymer may be added neat or as an emulsion in water; or added in one or more additions or continuously, linearly or nonlinearly, over the reaction period of preparing the polymer, or combinations thereof. Temperature suitable for emulsion polymerization processes may be lower than 100° C., in the range of from 30 to 95° C., or in the range of from 50 to 90° C.

Preferably, the process of preparing the polymer useful in the present invention includes a multistage free-radical polymerization in which at least two stages are formed sequentially, which usually results in the formation of the multistage polymer comprising at least two polymer compositions such as the polymer A and the polymer B. More preferably, the process includes first preparing the polymer A followed by preparing the polymer B. Each stage of the free-radical polymerization can be conducted by emulsion polymerization of the monomers described above. In the polymerization process, free radical initiators may be used in each stage.

The polymerization process of the polymer useful in the present invention may be thermally initiated or redox initiated emulsion polymerization, and preferably in each stage when multistage polymerization process is used. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01 to 3.0% by weight, based on the total weight of monomers. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the preceding acids. Metal salts of iron, copper, manganese, silver, platinum, vanadium, nickel, chromium, palladium, or cobalt may be used to catalyze the redox reaction. Chelating agents for the metals may optionally be used.

In the polymerization process of the polymer useful in the present invention, a surfactant may be used. The surfactant may be added prior to or during the polymerization of the monomers, or combinations thereof. A portion of the surfactant can also be added after the polymerization. Surfactants may be used for both stages or only in the first stage when multistage polymerization is used. In some embodiments, the polymer A obtained may act as a surfactant to emulsify the monomer mixture for preparing the polymer B.

These surfactants may include anionic and/or nonionic emulsifiers. Examples of suitable surfactants include alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. In some preferred embodiments, the alkali metal or ammonium salts of alkyl, aryl, or alkylaryl sulfates surfactant are used. The combined amount of the surfactant used is usually from 0.1% to 6% by weight or from 0.3% to 1.5% by weight, based on the weight of total monomers used for preparing the aqueous polymer dispersion of the present invention.

In the polymerization process of preparing the polymer useful in the present invention, one or more chain transfer agents may also be used. Examples of suitable chain transfer agents include 3-mercaptopropionic acid, dodecyl mercaptan, methyl 3-mercaptopropionate, benzenethiol, azelaic alkyl mercaptan, or mixtures thereof. The dosage of the chain transfer agent may be, based on the total weight of monomers, in an amount of from 0 to 5% by weight, from 0.01% to 2% by weight, or from 0.05% to 0.5% by weight.

After polymerization, the obtained polymer may be neutralized by using one or more bases as neutralizers. Examples of suitable bases include ammonia; alkali metal or alkaline earth metal compounds such as sodium hydroxide, potassium hydroxide, calcium hydroxide, zinc oxide, magnesium oxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, di-npropylamine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; aluminum hydroxide; or mixtures thereof.

The aqueous polymer dispersion of the present invention further comprises water. The concentration of water may be, by weight based on the total weight of the aqueous dispersion, from 30% to 90% or from 40% to 80%. The aqueous dispersion of the present invention may be useful in many applications including, for example, wood coatings, architecture coatings, and traffic paints.

The present invention also provides an aqueous coating composition comprising the aqueous polymer dispersion described above. The aqueous polymer dispersion in the aqueous coating composition of the present invention may be present, by solids weight based on the total weight of the aqueous coating composition, in an amount of 10% or more, 13% or more, or even 15% or more, and at the same time, 30% or less, 28% or less, or even 25% or less.

The aqueous coating composition of the present invention may also comprise pigments and/or extenders. "Pigments" herein refer to materials that can provide whiteness and color including inorganic pigments and organic pigments. Inorganic pigments typically include metal oxides. Examples of suitable metal oxides include titanium dioxide ($TiO_2$), zinc oxide, iron oxide, zinc sulfide, barium sulfate, barium carbonate, or mixture thereof. In a preferred embodiment, pigment used in the present invention is $TiO_2$. $TiO_2$ typically exists in two crystal forms, anastase and rutile. Suitable commercially available $TiO_2$ include, for example, KRONOS™ 2310 available from Kronos Worldwide, Inc., Ti-Pure™ R-706 available from DuPont (Wilmington, Del.), TiONA™ AT1 available from Millenium Inorganic Chemicals, or mixtures thereof. $TiO_2$ may be also available in concentrated dispersion form. Organic pigments typically refer to opaque polymers such as ROPAQUE™ Ultra E available from The Dow Chemical Company (ROPAQUE is a trademark of The Dow Chemical Company). "Extenders" herein refer to white transparent or semi-transparent components, whose purpose is to reduce the cost of the paint by increasing the area covered by a given weight of pigment. Examples of suitable extenders include calcium carbonate, clay, calcium sulfate, aluminosilicates, silicates, zeolites, mica, diatomaceous earth, solid or hollow glass, ceramic beads, nepheline syenite, feldspar, diatomaceous earth, calcined diatomaceous earth, talc (hydrated magnesium silicate), silica, alumina, kaolin, pyrophyllite, perlite, baryte, wollastonite, or mixtures thereof. The concentration of the pigments and/or extenders may be, by weight based on the total weight of the aqueous coating composition, from 0 to 40%, from 5% to 40%, from 8% to 35%, or from 10% to 30%.

The aqueous coating composition of the present invention may also comprise one or more matting agents. "Matting agents" herein refer to any inorganic or organic particles that provide matt effect. Matting agents usually have an average particle size of 5.5 microns or more according to the ASTM E2651-10 method. The matting agents may be selected from silica matting agents, polyurea matting agents, polyacrylate, polyethylene, polytetrafluoroethene, or mixtures thereof. Suitable commercially available matting agents include, for example, ACEMATT™ TS-100 and ACEMATT OK520 silica matting agents both available from Evonik, DEUTERON' MK polyurea matting agent available from Deuteron, SYLOID™ Silica 7000 matting agent available from Grace Davison, PARALOID™ PRD 137B emulsion based on polyacrylate available from The Dow Chemical Company; ULTRALUBE™ D277 emulsion based on HDPE/plastic, ULTRALUBE D818 emulsion based on montan/PE/plastic, and ULTRALUBE D860 emulsion based on PE/ester matting agents all available from Keim-Additec; or mixtures thereof. The matting agent may be present, by solids weight based on the total weight of the aqueous coating composition, in an amount of from 0 to 5%, from 0.1% to 4%, or from 0.5% to 3.5%.

The aqueous coating composition of the present invention may further comprise one or more defoamers. "Defoamers" herein refers to chemical additives that reduce and hinder the formation of foam. Defoamers may be silicone-based defoamers, mineral oil-based defoamers, ethylene oxide/propylene oxide-based defoamers, alkyl polyacrylates, or mixtures thereof. Suitable commercially available defoamers include, for example, TEGO™ Airex 902 W and TEGO Foamex 1488 polyether siloxane copolymer emulsions both available from TEGO, BYK™-024 silicone deformer available from BYK, or mixtures thereof. The defoamer may be present, by weight based on the total weight of the aqueous coating composition, in an amount of from 0 to 1%, from 0.01 to 0.8%, or from 0.05% to 0.5%.

The aqueous coating composition of the present invention may further comprise one or more thickeners, also known as "rheology modifiers". The thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferably, the thickener is based on HEUR. The thickener may be present, by weight based on the total weight of the aqueous coating composition, in an amount of from 0 to 3%, from 0.05% to 2%, or from 0.1% to 1%.

The aqueous coating composition of the present invention may further comprise one or more wetting agents. "Wetting agents" herein refer to chemical additives that reduce the surface tension of a coating composition, causing the aqueous coating composition to more easily spread across or penetrate the surface of a substrate. Wetting agents may be polycarboxylates, anionic, zwitterionic, or non-ionic. Suitable commercially available wetting agents include, for example, SURFYNOL™ 104 nonionic wetting agent based on an actacetylenic diol available from Air Products, BYK-346 and BYK-349 polyether-modified siloxanes both available from BYK, or mixtures thereof. The wetting agent may be present, by weight based on the total weight of the aqueous coating composition, in an amount of from 0 to 2.5%, from 0.1% to 2%, or from 0.2% to 1%.

The aqueous coating composition of the present invention may further comprise one or more coalescents. "Coalescents" herein refer to slow-evaporating solvents that fuse polymer particles into a continuous film under ambient condition. Examples of suitable coalescents include 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, or mixtures thereof. Preferred coalescents include dipropylene glycol n-butyl ether, ethylene glycol monobutyl ether, diethylene glycol monobutyl ether, n-butyl ether, or mixtures thereof. The coalescents may be present, by weight based on the total weight of the aqueous coating composition, in an amount of from 0 to 10%, from 0.1% to 9%, or from 1% to 8%.

The aqueous coating composition of the present invention may further comprise water. The concentration of water may be, by weight based on the total weight of the aqueous coating composition, from 30% to 90%, from 40% to 80%, or from 60% to 70%.

In addition to the components described above, the aqueous coating composition of the present invention may further comprise any one or combination of the following additives: buffers, neutralizers, dispersants, humectants, mildewcides, biocides, anti-skinning agents, colorants, flowing agents, anti-oxidants, plasticizers, leveling agents, thixotropic agents, adhesion promoters, and grind vehicles. These additives may be present, by weight based on the total weight of the aqueous coating composition, in a combined amount of from 0 to 10%, from 0.001% to 10%, or from 0.01% to 2%.

The aqueous coating composition of the present invention may be prepared with techniques known in the coating art. The process of preparing the aqueous coating composition of the present invention may comprise by admixing the aqueous polymer dispersion with other optional components as described above. Components in the aqueous coating composition may be mixed in any order to provide the aqueous coating composition of the present invention. Any of the above-mentioned optional components may also be added to the composition during or prior to the mixing to form the aqueous coating composition.

The aqueous coating composition of the present invention provides coating films obtained therefrom, i.e., the coatings after drying the aqueous coating composition applied to a substrate, such as Cedar, with excellent tannin blocking as indicated by an initial $b \leq 2.5$ and delta E (40° C., 85% humidity, 24 hours)$\leq 1.5$, or delta E$\leq 1.3$; an early block resistance level of C or better; and a sandability level of 3 or higher and preferably 4 or higher. The tannin blocking, early block resistance and sandability are measured according to the test methods described in the Examples section.

The present invention also provides a method of improving tannin blocking of a coating. The method comprises: providing the aqueous coating composition of the present invention, applying the aqueous coating composition to a wood substrate, and drying, or allowing to dry, the aqueous coating composition to form a coating. "Improving tannin blocking" means the coating have improved tannin blocking, that is, the coating has an initial b$\leq 2.5$ and delta E (40° C., 85% humidity, 24 hours)$\leq 1.5$, or delta E$\leq 1.3$ as measured according to the test method described in the Examples section. Drying or allowing to dry the aqueous coating composition of the present invention can be conducted at room temperature (20-25° C.), or at an elevated temperature, for example, from 35° C. to 60° C. to form a film (this is, coating).

A method of preparing a coating may comprise forming the aqueous coating composition of the present invention, applying the aqueous coating composition to a substrate, and drying, or allowing to dry, the applied coating composition to form the coating.

A process of using the aqueous coating composition of the present invention may comprise: applying the aqueous coating composition to a substrate, and drying, or allowing to dry, the applied coating composition. The aqueous coating composition of the present invention can be applied to a substrate by incumbent means including brushing, dipping, rolling and spraying. The aqueous coating composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. The aqueous coating composition of the present invention can be applied to, and adhered to, various substrates. Examples of suitable substrates include wood, metals, plastics, foams, stones, elastomeric substrates, glass, fabrics, concrete, or cementious substrates. The aqueous coating composition is suitable for various coating applications, such as marine and protective coatings, automotive coatings, wood coatings, coil coatings, plastic coatings, powder coatings, can coatings, and civil engineering coatings. The aqueous coating composition is particularly suitable for wood coatings. The aqueous coating composition can be used a primer, or in combination with other coatings to form multi-layer coatings.

EXAMPLES

Some embodiments of the invention will now be described in the following Examples, wherein all parts and percentages are by weight unless otherwise specified. The following materials are used in the examples:

2-ethylhexyl acrylate ("EHA"), cyclohexyl methacrylate ("CHMA"), butyl acrylate ("BA"), methacrylic acid ("MAA"), styrene ("ST"), methyl methacrylate ("MMA"), allyl(meth)acrylate ("ALMA"), ammonium persulfate ("APS") are all available from Sinoreagent Group.

Phosphoethyl methacrylate (PEM) is available from The Dow Chemical Company.

AEROSOL A-102, available from Cytec, is a polyethylene glycol alkyl (C10-C12) ether sulfosuccinate disodium salt.

PRIMAL™ MV-23LO ("MV-23LO"), available from The Dow Chemical Company, is a pure acrylic polymer (PRIMAL is a trademark of The Dow Chemical Company).

AMP-95™, available from The Dow Chemical Company, is 2-amino-2-methyl-1-propanol and used as a dispersant (AMP-95 is a trademark of The Dow Chemical Company).

OROTAN™ 731A, available from The Dow Chemical Company, is a sodium salt of a hydrophobic acrylic copolymer and used as a dispersant (OROTAN is a trademark of The Dow Chemical Company).

SURFYNOL 420, available from Air Product, is an ethoxylated wetting agent and used as a dispersant.

Ti-Pure R-706 ("R-706"), available from DuPont, is titanium dioxide and used as a filler.

Zinc oxide, available from Sinoreagent Group, is used as a filler.

DOWANOL™ EB ("EB"), available from The Dow Chemical Company, is ethylene glycol monobutyl ether and used as a coalescent (DOWANOL is a trademark of The Dow Chemical Company).

DOWANOL DPnB, available from The Dow Chemical Company, is dipropylene glycol n-butyl ether ("DPnB") and used as a coalescent.

TEGO Airex 902W ("902W"), available from Tego, is a polyether siloxane copolymer containing fumed silica and used as a defoamer.

ACRYSOL RM-8W rheology modifier ("RM-8W"), available from The Dow Chemical Company, is a nonionic urethane rheology modifier.

The following standard analytical equipment and methods are used in the Examples.

Minimum Film Formation Temperature (MFFT)

MFFT was measured by a Coesfeld MFFT instrument. An aqueous polymer dispersion to be tested was casted on a heating plate with a gradient temperature to form a 75 μm wet film. The film was dried and the minimum temperature at which a coherent film was formed was recorded as the MFFT.

Tannin Blocking Test

Quantitative measurement of the tannin blocking was conducted using a SHEEN color meter with dimension L for lightness, a and b represent for the color-opponent dimensions, based on nonlinearly compressed CIE XYZ color space coordinates, according to the ASTM D2244-15A method. L, a, b values were recorded and delta E was calculated and used to indicate difference of yellow stain of coatings.

Coating panels were prepared as follows: A primer, that is, a coating composition to be tested, was applied on Cedar and cured at room temperature (RT) for 2 hours (h) to form a first primer layer. After sanding the first primer layer, a second layer of the primer was applied and then cured at RT for 2 h. A top coat (ROSHIELD 3311, an aqueous acrylic emulsion available from The Dow Chemical Company) was then applied on the second layer of the primer and cured at RT for 2 h. Then initial color ($L_1$, $a_1$, and $b_1$ values) of the obtained panels was measured. The panels were further placed into an environmental chamber (40° C., 85% humidity) for 24 h. After that, 24 h color ($L_2$, $a_2$, and $b_2$ values) was measured. Delta E and delta b values are determined by the following equations, $$\text{delta } E = \sqrt{(L_1-L_2)^2+(a_1-a_2)^2+(b_1-b_2)^2},$$

$$\text{delta } b = b_2 - b_1.$$

The lower the initial b and delta E values, the better tannin blocking. The initial b value ($b_1$)≤2.5 and delta≤1.5 are acceptable.

Sandability

Coating panels were first prepared as described in the tannin blocking test. Sandability means how easy to get a smooth surface when sanding a coating. Sandability was rated on a scale of 1-5, based on the shape of dust created by sanding:

5—Powder; 4—Powder to strip; 3—Strip; 2—Large aggregate; and 1—not sandable.

Sandability rating as 3 or higher is acceptable.

Early Block Resistance

Early block resistance was measured according to the GB/T 23982-2009 standard. A wood block (7 cm×5 cm) was balanced at room temperature and 50% humidity for 7 days. One layer of coating was brushed onto the wood block at 80-90 grams per square meter (g/m²) of the wood, cured at room temperature for 3 hours, then were sanded with sand paper. The second coating layer was brushed onto the wood block at 80-90 g/m² and cured at room temperature for 24 hours. Two coated wood blocks were stacked together face to face with 1 kg weight on them and then placed into an oven at 50° C. for 4 hours. Then, the 1 kg weight was removed and the two stacked wood blocks were balanced at room temperature for 1 hour. The two stacked wood blocks were then separated from each other to evaluate the early block resistance.

The rating of the early block resistance property is defined by the separating force and the area of damaging:

A: separated without any force;
B: separated by a slight blow;
C: separated by low force with hands
D: separated by medium force with hands;
E: separated by huge force with hands;
F: separated by tools The number means area of damage:

0: no damage; 1: ≤1%; 2: >1% and ≤5%; 3: >5% and ≤20%; 4: >20% and ≤50%; 5: >50%.

A-0 represents the best and F-5 is the worst. The early block resistance should be C or better to be acceptable.

L-B Comparative Polymer Emulsion

Preparation of Monomer Emulsion 1 (ME 1): AEROSOL A-102 surfactant (14.1 g, 31% active) was dissolved in deionized water (224 g), with stirring. Then monomers were slowly added to the agitated solution, based on ME 1 formulations described in Table 1.

Preparation of Monomer Emulsion 2 (ME 2): AEROSOL A-102 surfactant (6.0 g, 31% active) was dissolved in deionized water (99 g), with stirring. Then monomers were slowly added to the agitated solution, based on ME 2 formulations described in Table 1.

A solution containing AEROSOL A-102 surfactant (31% active, 16.7 g) and deionized water (617 g) was placed in a 3 liter 4-neck round-bottom flask equipped with a thermocouple, a cooling condenser and an agitator, and was heated to 85° C. under nitrogen. An aqueous sodium carbonate solution (1.58 g sodium carbonate in 38 g deionized water), an aqueous ammonia persulfate (APS) initiator solution (2.1 g APS in 38 g deionized water), and 3.31% of Monomer Emulsion 1 were added to the flask. 45 g deionized water was used to rinse the above vessels. In about 5 minutes, initiation of polymerization was confirmed by the increase of temperature by 3° C. and a change of the external appearance of the reaction mixture. After heat generation ended, the remainder of the Monomer Emulsion 1 was gradually added to the flask over 70 minutes, with stirring. Polymerization reaction temperature was maintained at 84-86° C. After the addition was completed, the vessel containing the Monomer Emulsion 1 and the feeding pipes leading into the flask were rinsed with 40 g deionized water, and the rinse was added back to the flask.

Monomer Emulsion 2 was then added in the same manner as Monomer Emulsion 1 over 30 minutes. Upon completing the addition, the reaction mixture was held at 70° C. for 60 minutes. The reaction was cooled to 50° C. and then neutralized to pH 7.0-8.5 by ammonia (30%). The reaction mixture was held at 45 to 50° C. for 10 minutes. Then the reaction was cooled to room temperature to get a final polymer emulsion with solids around 40-42% and MFFT<10° C.

L 1 through L6, L 9 and L 10 Two-stage Polymer Emulsions

The polymer emulsions of L 1 through L6, L 9 and L 10 were prepared according to the same procedure as described above for preparing the polymer emulsion of L-B, based on monomers described in Table 1. The final polymer emulsions had solids around 40-42% and MFFT<10° C. except MFFT of L 4 was around 36° C.

L 7 and L 8 Two-Stage Polymer Emulsions

The polymer emulsions of L 7 and L 8 were prepared according to the same procedure as described above for preparing the polymer emulsion of L-B, based on monomers described in Table 1, except that no aqueous sodium carbonate solution was added into flask before the polymerization. The final polymer emulsions had solids around 40-42% and MFFT<10° C.

L-C and L-D Comparative Two-Stage Polymer Emulsions

Polymer emulsions of L-C and L-D were prepared according to the same procedure as described above for preparing the polymer emulsion of L-B, based on monomers described in Table 1. The final polymer emulsions had solids around 40-42% and MFFT<10° C.

L 12 One-Stage Polymer Emulsion

The polymer emulsion of L 12 was prepared according to the same procedure as described above for preparing the polymer emulsion of L 11, based on formulations of Monomer Emulsion 3 described in Table 2. The obtained polymer emulsion had solids around 40-42% and MFFT<10° C.

TABLE 2

| | Monomer Emulsion 3 | | | | |
|---|---|---|---|---|---|
| Emulsions | CHMA (g) | EHA (g) | MMA (g) | ST (g) | PEM (g) |
| L 11 | 208 | 385 | 277.6 | 155.5 | 11.6 |
| L 12 | 208 | 311 | 320 | 187 | 11.6 |

TABLE 1

| | ME 1 for preparing polymer A | | | | | | | | Polymer A | ME 2 for preparing polymer B | | Polymer B |
|---|---|---|---|---|---|---|---|---|---|---|---|---|
| Emulsions | CHMA (g) | EHA (g) | MMA (g) | ALMA (g) | MAA (g) | PEM (g) | BA (g) | ST (g) | $T_g$ (° C.) | MMA (g) | ST (g) | $T_g$ (° C.) |
| L-B | 0.0 | 425.0 | 277.0 | 2.9 | 21.8 | 0.0 | 0.0 | 0.0 | −34.1 | 155.5 | 155.5 | 106.0 |
| L-C | 103.9 | 385.0 | 216.4 | 2.9 | 14.5 | 3.6 | 0.0 | 0.0 | −26.9 | 155.5 | 155.5 | 106.0 |
| L-D | 207.7 | 385.0 | 112.6 | 2.9 | 14.5 | 3.6 | 0.0 | 0.0 | −28.3 | 311.0 | 0.0 | 105.0 |
| L 1 | 207.7 | 385.0 | 109.0 | 2.9 | 21.8 | 0.0 | 0.0 | 0.0 | −28.2 | 155.5 | 155.5 | 106.0 |
| L 2 | 207.7 | 385.0 | 112.6 | 2.9 | 14.5 | 3.6 | 0.0 | 0.0 | −28.3 | 155.5 | 155.5 | 106.0 |
| L 3 | 311.6 | 385.0 | 8.7 | 2.9 | 14.5 | 3.6 | 0.0 | 0.0 | −29.7 | 155.5 | 155.5 | 106.0 |
| L 4 | 414.1 | 287.6 | 3.6 | 2.9 | 14.5 | 3.6 | 0.0 | 0.0 | −7.6 | 155.5 | 155.5 | 106.0 |
| L 5 | 207.7 | 385.0 | 119.1 | 2.9 | 0.0 | 11.6 | 0.0 | 0.0 | −28.6 | 155.5 | 155.5 | 106.0 |
| L 6 | 207.7 | 385.0 | 11.6 | 2.9 | 0.0 | 11.6 | 0.0 | 107.5 | −28.9 | 0.0 | 311.0 | 100.0 |
| L 7 | 207.7 | 385.0 | 122.0 | 0.0 | 0.0 | 11.6 | 0.0 | 0.0 | −29.2 | 155.5 | 155.5 | 106.0 |
| L 8 | 207.7 | 385.0 | 199.8 | 0.0 | 0.0 | 11.6 | 0.0 | 77.8 | −13.2 | 77.8 | 77.8 | 106.0 |
| L 9 | 207.7 | 109.0 | 63.9 | 2.9 | 0.0 | 11.6 | 334.1 | 0.0 | −21.1 | 155.5 | 155.5 | 106.0 |
| L 10 | 207.7 | 385.0 | 114.3 | 2.9 | 0.0 | 16.3 | 0.0 | 0.0 | −28.4 | 155.5 | 155.5 | 106.0 |

L 11 One-Stage Polymer Emulsion

Preparation of Monomer Emulsion 3: AEROSOL A-102 surfactant (20.1 g, 31% active) was dissolved in deionized water (323 g), with stirring. Then monomers were slowly added to the agitated solution, based on formulations of Monomer Emulsion 3 described in Table 2.

A solution containing AEROSOL A-102 surfactant (31% active, 16.7 g) and deionized water (617 g) was placed in a 3 liter 4-neck round-bottom flask equipped with a thermocouple, a cooling condenser and an agitator, and was heated to 85° C. under nitrogen. An aqueous ammonia persulfate (APS) initiator solution (2.1 g APS in 38 g deionized water), and 2.31% of Monomer Emulsion 3 were added to the flask. 83 g deionized water was used to rinse the above vessels. In about 5 minutes, initiation of polymerization was confirmed by the increase of temperature by 3° C. and a change of the external appearance of the reaction mixture. After heat generation ended, the remainder of the Monomer Emulsion 3 was added gradually to the flask over 100 minutes, with stirring. Polymerization reaction temperature was maintained at 84-86° C. After the addition was completed, the vessel containing the Monomer Emulsion 3 and the feeding pipes leading into the flask were rinsed with 40 g deionized water, and the rinse was added back to the flask.

Upon completing the addition, the reaction mixture was held at 70° C. for 60 minutes. The reaction was cooled to 50° C. and then neutralized to pH 7.0-8.5 by ammonia (30%). The reaction mixture was held at 45 to 50° C. for 10 minutes. Then the reaction was cooled to room temperature to get a final polymer emulsion with solids around 40-42% and MFFT<10° C.

Examples (Exs) 1-10 and Comparative (Comp) Exs A-D Coating Compositions

The coating composition of Comp Ex A comprising a commercial pure acrylic polymer dispersion (PRIMAL MV-23LO), and the coating compositions of Exs 1-10 and Comp Exs B-D comprising the aqueous polymer emulsions obtained above were prepared based on formulations described in Tables 3 and 4. Ingredients of the grind were mixed using a conventional lab mixer. The binder was added into the grind. Then other ingredients of the letdown were added into the resultant mixture. The obtained coating compositions were evaluated according to the test methods described above. Properties of the obtained coating films are given in Table 4.

As shown in Table 4, the coating compositions of Comp Exs A-D all provided coating films with poor tannin blocking as indicated by unacceptable high initial b values due to undesirably high amount of tannin penetrating through the coating films during preparation of coating panels. In addition, coating films made from the coating composition of Comp Ex A showed unacceptable early block resistance and sandability. In contrast, the coating compositions of Exs 1-12 all provided coating films with lower initial b values indicating less tannin penetrated through the coating films during preparation of coating panels and acceptable delta E values. In addition, the coating films made from Exs 1-12 also demonstrated satisfactory early block resistance (C or better) and sandability (3 or higher).

TABLE 3

|  | Comp Ex A | Comp Exs B, C and D | Exs 1-3 and 5-12 | Ex 4 | Top coat (Binder: ROSHIELD 3311) |
|---|---|---|---|---|---|
| Grind, gram |  |  |  |  |  |
| Water | 5.42 | 5.42 | 5.42 | 5.42 | 5.42 |
| AMP-95 | 0.08 | 0.08 | 0.08 | 0.08 | 0.08 |
| OROTAN 731A | 0.42 | 0.42 | 0.42 | 0.42 | 0.42 |
| SURFYNOL 420 | 0.08 | 0.08 | 0.08 | 0.08 | 0.08 |
| R-706 | 15.00 | 15.00 | 15.00 | 15.00 | 15.00 |
| Zinc oxide | 0.42 |  |  |  |  |
| Letdown, gram |  |  |  |  |  |
| Water | 14.00 | 12.00 | 12.00 | 7.50 | 11.05 |
| Binder | 60.50 | 62.00 | 62.00 | 62.00 | 63.45 |
| EB |  |  |  | 2 | 2.50 |
| DPnB | 0.5 | 0.5 | 0.5 | 3 | 1.67 |
| 902W | 0.17 | 0.17 | 0.17 | 0.17 | 0.17 |
| RM-8W | 0.25 | 0.25 | 0.25 | 0.25 | 0.25 |
| Total, gram | 100.50 | 99.97 | 99.97 | 99.97 | 100.08 |
| Solids content | 42% | 42% | 42% | 42% | 42% |

TABLE 4

|  | Binder Type | Sand-ability | Early Block | Initial | | | 24 h | | | Delta E | Delta b |
|---|---|---|---|---|---|---|---|---|---|---|---|
|  |  |  |  | $L_1$ | $a_1$ | $b_1$ | $L_2$ | $a_2$ | $b_2$ |  |  |
| Comp Ex A | MV-23LO | 2 | E-4 | 95.42 | −0.25 | 3.7 | 94.72 | −0.09 | 4.62 | 1.17 | 0.92 |
| Comp Ex B | L-B | 3 | B-1 | 95.11 | −0.24 | 4.13 | 94.75 | −0.03 | 4.92 | 0.89 | 0.79 |
| Ex 1 | L 1 | 4 | B-1 | 95.53 | −0.3 | 2.11 | 95.26 | −0.28 | 2.47 | 0.45 | 0.36 |
| Ex 2 | L 2 | 4 | B-2 | 95.98 | −0.48 | 1.77 | 95.85 | −0.46 | 2.22 | 0.47 | 0.45 |
| Comp Ex C | L-C | 5 | C-2 | 96.55 | −0.58 | 3.53 | 95.95 | −0.42 | 3.95 | 0.75 | 0.42 |
| Ex 3 | L 3 | 5 | C-2 | 96.63 | −0.53 | 1.84 | 96.27 | −0.52 | 2.33 | 0.61 | 0.49 |
| Ex 4 | L 4 | 5 | C-3 | 96.34 | −0.45 | 2.46 | 95.57 | 0.15 | 3.57 | 1.48 | 1.11 |
| Ex 5 | L 5 | 5 | B-1 | 96.85 | −0.66 | 1.78 | 96.56 | −0.62 | 2.81 | 1.07 | 1.03 |
| Comp Ex D | L-D | 4 | B-2 | 95.61 | −0.66 | 3.2 | 95.01 | −0.4 | 4.52 | 1.47 | 1.32 |
| Ex 6 | L 6 | 4 | B-2 | 93.76 | −0.23 | 1.12 | 93.72 | −0.28 | 1.27 | 0.16 | 0.15 |
| Ex 7 | L 7 | 4 | B-2 | 94.84 | −0.32 | 0.47 | 94.69 | −0.48 | 0.75 | 0.36 | 0.28 |
| Ex 8 | L 8 | 4 | C-3 | 94.92 | −0.32 | 0.42 | 94.63 | −0.32 | 0.7 | 0.40 | 0.28 |
| Ex 9 | L 9 | 4 | B-1 | 94.08 | −0.48 | 1.06 | 93.94 | −0.52 | 2.28 | 1.23 | 1.22 |
| Ex 10 | L 10 | 3 | B-1 | 94.6 | −0.45 | 2.13 | 94.27 | −0.35 | 2.74 | 0.70 | 0.61 |
| Ex 11 | L 11 | 4 | C-2 | 95.03 | −0.39 | 0.61 | 94.62 | −0.4 | 1.15 | 0.68 | 0.54 |
| Ex 12 | L 12 | 3 | C-2 | 93.92 | −0.32 | 1.54 | 93.57 | −0.25 | 2.06 | 0.63 | 0.52 |

What is claimed is:

1. An aqueous polymer dispersion, wherein the polymer comprises as polymerized units, based on the total dry weight of the polymer,
   (i) from 5% to 50% by weight of a $C_6$-$C_{18}$ alkyl ester of (meth)acrylic acid;
   (ii) from 15% to 45% by weight of a cycloalkyl (meth)acrylate; and
   (iii) from 1% to 10% by weight of an acid monomer selected from an α,β-ethylenically unsaturated carboxylic acid, a phosphorous-containing acid monomer, or mixtures thereof; and
   (iv) from 5% to 50% by weight of a vinyl aromatic monomer; and
   (v) from 0 to 55% by weight of a $C_1$-$C_4$ alkyl ester of (meth)acrylic acid;
   wherein the polymer has a glass transition temperature less than 45° C.

2. An aqueous polymer dispersion, wherein the polymer is a multistage polymer comprising:
   (A) a polymer A comprising, as polymerized units,
      (a1) a $C_6$-$C_{18}$ alkyl ester of (meth)acrylic acid;
      (a2) a cycloalkyl (meth)acrylate; and
      (a3) an acid monomer selected from an α,β-ethylenically unsaturated carboxylic acid, a phosphorous-containing acid monomer, or mixtures thereof;
      (a4) optionally a vinyl aromatic monomer; and
      (a5) optionally a $C_1$-$C_4$ alkyl ester of (meth)acrylic acid; and
   (B) a polymer B having a $T_g$ of at least 70° C. and comprising, as polymerized units, one or more monomers selected from a vinyl aromatic monomer, a cycloalkyl (meth)acrylate, or mixtures thereof; and
   wherein the weight ratio of the polymer A to the polymer B is from 50:50 to 95:5.

3. The aqueous polymer dispersion of claim 2, wherein the polymer B comprises as polymerized units, based on the total dry weight of the polymer, from 5% to 50% by weight of the vinyl aromatic monomer.

4. The aqueous polymer dispersion of claim 1, wherein the cycloalkyl (meth)acrylate is cyclohexyl methacrylate.

5. The aqueous polymer dispersion of claim 1, wherein the polymer comprises as polymerized units, based on the total dry weight of the polymer, from 20% to 40% by weight of the cycloalkyl (meth)acrylate.

6. The aqueous polymer dispersion of claim 1, wherein the polymer comprises as polymerized units, based on the total dry weight of the polymer, from 1% to 7% by weight of the acid monomer.

7. The aqueous polymer dispersion of claim 1, wherein the phosphorous-containing acid monomer is selected from phosphoethyl (meth)acrylate, phosphopropyl (meth)acrylate, phosphobutyl (meth)acrylate, or mixtures thereof.

8. The aqueous polymer dispersion of claim 1, wherein the $C_6$-$C_{18}$ alkyl ester of (meth)acrylic acid is selected from 2-ethylhexyl acrylate, lauryl (meth)acrylate, stearyl (meth)acrylate, or mixtures thereof.

9. The aqueous polymer dispersion of claim 2, wherein the weight ratio of the polymer A to the polymer B is from 60:40 to 90:10.

10. The aqueous polymer dispersion of claim 2, wherein the polymer comprises, based on the total dry weight of the polymer,
the polymer A comprising, as polymerized units,
(a1) from 25% to 45% by weight of the $C_6$-$C_{18}$ alkyl ester of (meth)acrylic acid;
(a2) from 25% to 35% by weight of the cycloalkyl (meth)acrylate; and
(a3) from 1.3% to 5% by weight of the acid monomer selected from an α,β-ethylenically unsaturated carboxylic acid, a phosphorous-containing acid monomer, or mixtures thereof;
(a4) from 0 to 30% by weight of the vinyl aromatic monomer; and
(a5) from 0 to 35% by weight of the $C_1$-$C_4$ alkyl ester of (meth)acrylic acid; and
the polymer B comprising, as polymerized units, from 5% to 40% by weight of the vinyl aromatic monomer, the cycloalkyl (meth)acrylate, or mixtures thereof.

11. An aqueous coating composition comprising the aqueous polymer dispersion of claim 1.

12. The aqueous coating composition of claim 11, further comprising pigments.

13. A method of improving tannin blocking of a coating, comprising:
providing an aqueous coating composition of claim 11,
applying the aqueous coating composition to a wood substrate, and
drying, or allowing to dry, the aqueous coating composition to form a coating.

* * * * *